US009288225B1

(12) United States Patent
Fei et al.

(10) Patent No.: US 9,288,225 B1
(45) Date of Patent: Mar. 15, 2016

(54) SERVER PORT SHARING BASED ON SHARED SOCKET

(71) Applicant: CA, Inc., Islandia, NY (US)

(72) Inventors: Gong jun Fei, Beijing (CN); Zhenghua Xu, Beijing (CN); Alexey Shvechkov, Hopkinton, MA (US); Kai Ma, Beijing (CN)

(73) Assignee: CA, Inc., Islandia, NY (US)

( * ) Notice: Subject to any disclaimer, the term of this patent is extended or adjusted under 35 U.S.C. 154(b) by 179 days.

(21) Appl. No.: 13/864,920

(22) Filed: Apr. 17, 2013

(51) Int. Cl.
G06F 15/16 (2006.01)
H04L 29/06 (2006.01)

(52) U.S. Cl.
CPC .................... *H04L 63/1441* (2013.01)

(58) Field of Classification Search
CPC ............ H04L 29/12066; H04L 61/1511; H04L 67/2814; H04L 69/166; H04L 69/18; H04L 69/32; H04L 67/14; H04L 29/06; H04L 29/12377; H04L 61/2517; G06F 17/30985; G06F 9/4416; G06F 11/0739; G06F 11/079; G06F 11/0793; G06F 21/606; G06F 9/54; B60L 11/1816; B60L 11/1824; B60L 11/1842; B60L 11/185
USPC ......... 709/200, 202, 213, 217, 219, 220, 228, 709/229, 230, 231, 233, 235, 236, 237, 238, 709/249, 203–207, 223–227; 370/392, 293, 370/227, 230, 252, 389, 401, 466, 474
See application file for complete search history.

(56) References Cited

U.S. PATENT DOCUMENTS

| 5,657,390 A * | 8/1997 | Elgamal et al. ............... 713/151 |
| 8,914,480 B1 * | 12/2014 | Jones et al. .................... 709/227 |
| 2005/0025156 A1 * | 2/2005 | Smathers .................... 370/395.5 |
| 2005/0076126 A1 * | 4/2005 | Knight et al. ................ 709/227 |
| 2006/0020688 A1 * | 1/2006 | Chang et al. ................. 709/219 |
| 2007/0061434 A1 * | 3/2007 | Schmieder et al. ........... 709/223 |
| 2008/0077692 A1 * | 3/2008 | Zuberi .......................... 709/227 |
| 2009/0254664 A1 * | 10/2009 | Wada ............................ 709/227 |
| 2011/0161403 A1 * | 6/2011 | Fu ................................ 709/203 |
| 2012/0173740 A1 * | 7/2012 | Shukla ......................... 709/228 |
| 2012/0215831 A1 * | 8/2012 | Urbach ......................... 709/203 |
| 2014/0108664 A1 * | 4/2014 | Falco et al. ................... 709/227 |

OTHER PUBLICATIONS

Microsoft—WSASocket function.*

* cited by examiner

Primary Examiner — Hitesh Patel
(74) Attorney, Agent, or Firm — Gilliam IP PLLC

(57) ABSTRACT

A method includes receiving a connection request at a connection server port via a network from a client, the connection request directed to an application server, duplicating a socket for the communication and passing the socket to the application server, and replying to the network client connection request to establish a direct connection between the client and the application server via the passed socket, and this method support SSL protocol via passed socket.

23 Claims, 6 Drawing Sheets

SERVER PORT SHARING BASED ON SHARED SOCKET

BACKGROUND

To prevent an intranet from outer attacks in a wide area network, an enterprise will deploy security equipment, such as a mandatory firewall. Such security equipment is generally configured to block TCP traffic on all ports except for well-known entry points. Limiting traffic to a limited number of well-known ports makes deploying an application by using non well-known ports complicated or even impossible due to the presence of firewall or other personal firewalls. What's worse, if the network applications open many different unknown ports for inbound connections or different network applications support different network protocols, administrators may need to configure the network security equipment to permit these connections through, which also exposes critical servers to risks and pose greater risks for application deployment in a cloud environment.

BRIEF SUMMARY

A method includes receiving a connection request at a connection server port via a network from a client, the connection request directed to an application server, duplicating a socket for the communication and passing the socket to the application server, and replying to the network client connection request to establish a direct connection between the client and the application server via the passed socket.

A system includes a connection server configured to receive a connection request at a connection server port via a network from a client, the connection request directed to an application server. The connection server is further configured to duplicate a socket for the communication and pass the socket to the application server. The connection server is further configured to reply to the network client connection request to establish a direct connection between the client and the application server via the passed socket.

A computer program product includes a computer readable storage medium having computer readable program code embodied therewith. The computer program code is configured to cause a connection server to receive a connection request at a connection server port via a network from a client, the connection request directed to an application server, duplicate a socket for the communication and passing the socket to the application server, and reply to the network client connection request to establish a direct connection between the client and the application server via the passed socket.

In a further embodiment, a method includes receiving a secure socket layer (SSL) connection request at a connection server port via a network from a client, the connection request directed to an application server, duplicating a socket for the communication and passing the socket to the application server, and replying to the network client connection request to establish a direct SSL connection between the client and the application server via the passed socket.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
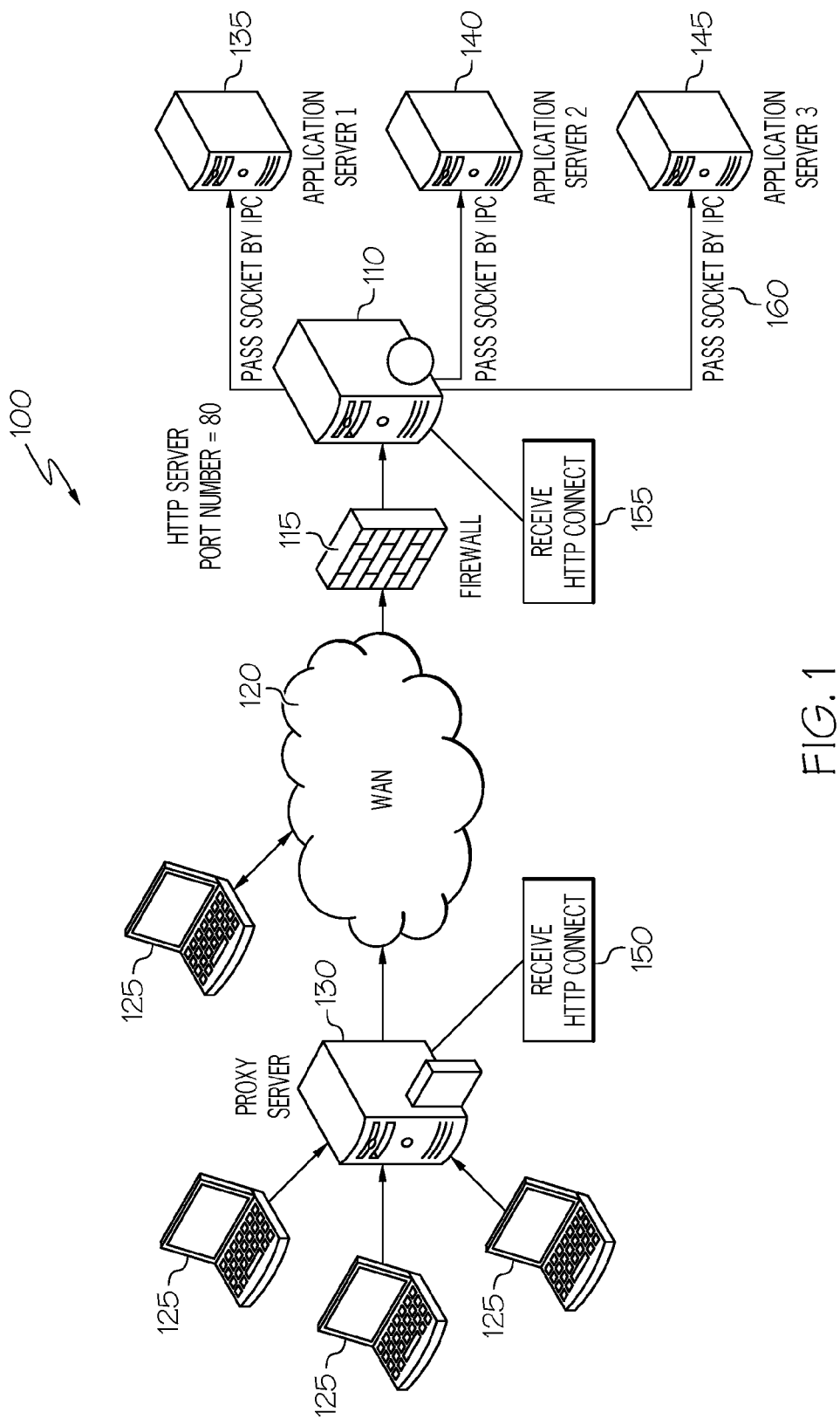
FIG. 1 is a block diagram of a port sharing system according to an example embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In various embodiments, port sharing is enabled to provide network applications the ability to provide inbound connections. Network traffic to different backend applications is multiplexed to a single well known port, which a frontend connection server has bound and listens to. Rather than a server acting as a relay, network traffic is directly routed to the backend applications using the bound port. The use of the bound port minimizes network application deployment cost and network security risks.

In one embodiment, the connection server is an Apache HTTP Server, a robust and widely used Web server. In prior servers, the server acts as a relay, via a well-known port, between a network client and an application server. The server receives and forwards TCP data to and from the network client without encapsulating each packet by HTTP protocol header. Apparently, the procedure results in a huge overload stress and CPU usage wastes. What's worse, the server exists as a single point of failure.

FIG. 1 is a block diagram of a system 100 incorporating an HTTP server 110, such as an Apache Server, to facilitate port sharing. In one embodiment, the HTTP server 110 sits behind a firewall 115 that is coupled to a wide area network 120. Multiple network application clients 125 may be coupled to the network 120 either directly or via a proxy server 130. The HTTP server 110 is coupled to one or more application servers indicated at 135, 140, and 145. Each of the servers may have an ID that includes a global unique ID (GUID) along with a local port number, such as 1, 2, and 3 for application servers 135, 140, and 145 respectively. To establish a connection between a client 125 and an application server, an HTTP CONNECT method may be initiated via the proxy server 130 as indicated at 150. The HTTP CONNECT is received as indicated at 155 at the HTTP server 110 to establish the connection. A socket is then passed via inter-process communication (IPC) as indicated at 160 to an application server. Each application server may be passed the socket in a multiplexed manner as needed.

Figure 2:
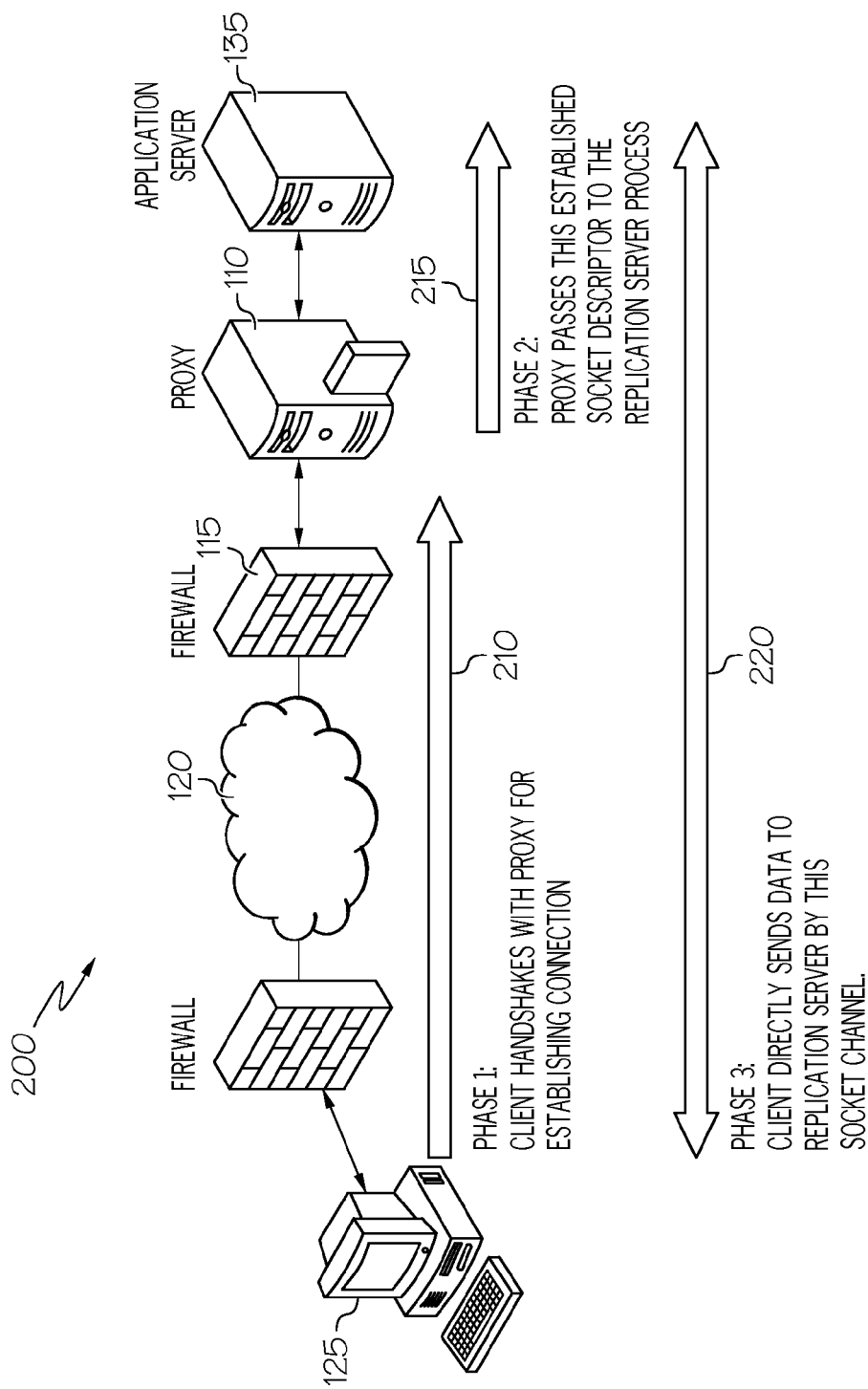
FIG. 2 is a block flow diagram illustrating establishment of a direct connection according to an example embodiment.

FIG. 2 is a high level block flow diagram illustrating the establishment of a direct connection generally at 200. Three phases of communication between the client 125 and application server such as application server 135 are illustrated. In a first phase 210, the client handshakes with the HTTP server to start to establish a connection. The IP address: 155.35.70.180 is used in this example to establish a socket connection at port 443. At phase two at 215, the HTTP server 110 passes an established socket descriptor to an application server process to replicate the port as 7788. In phase three at 220, the client 125 directly sends data to the server 135 via a channel using the socket, without the HTTP server 110 acting as a relay.

With the internet and cloud computing popularity, there are many application products that have to be firewall friendly. An HTTP server employs a modular and scalable framework. Many applications have leveraged their application servers by an HTTP Server. Using a shared multiplexed port the HTTP server 110 may make product deployment much easier, more productive and more rapidly respond to the network client and HTTP protocol compliant without knowledge of the HTTP protocol in the application servers.

In contrast to the traditional port sharing solution, the use of a shared multiplexed port solution is different in many aspects. When prior servers act as a relay, they receive and forward the payload to the backend, or application server. A shared multiplexed port described in various embodiments herein does not act as a relay, which decreases the overall network performance pressure. In one embodiment, a shared socket framework based on the HTTP server and the application server sharing the same socket descriptor with an HTTP server proxy module allows a client and application server to directly exchange data without the intervention of HTTP Server.

In further detail, the client 125 connects to and challenges the local proxy server 130 by an HTTP CONNECT protocol method 150, which specifies the related client credentials and the hostname, port number to connect to, such as the HTTP server 110 and port number 80, for example. Different port numbers may also be used. After the local proxy server 130 authenticates the user credentials and the remote HTTP server 110 is available, the client 125 will receive the successful response from the proxy; otherwise it will receive the corresponding error HTTP protocol reply.

An example HTTP CONNECT method may be used:
CONNECT home.apacheserver.com:80 HTTP/1.0
User-agent: Mozilla/1.1N
Proxy-authorization: basic aGVsbG86d29ybGQ=
The response follows the HTTP/1.0 protocol:
HTTP/1.0 200 Connection established The Proxy-authorization section comprises client credentials. CONNECT is really a lower-level function than the rest of the HTTP methods, effectively an escape mechanism for saying that the proxy shouldn't interfere with the transaction, but merely forward the data, because the proxy should not need to know the entire uniform resource identifier (URI) that is being accessed (privacy, security), only the information that it explicitly needs (Hostname and port Number).

After the first CONNECT method, the client connects to the remote HTTP server, and uses a second CONNECT method to specify the destination application server hostname and port number to connect to, such as port2 and port3. The second CONNECT method may be invoked in the same manner as the first CONNECT method shown above, and is used to connect to the application server or servers 135, 140, 145.

After the above second step in the current solution, the HTTP server proxy module will receive the challenge from the client; then it tries to establish an IPC (inter-process communication) channel to the application server according to the predefined the connection rules to pass the socket to it. Then the network client and application server can exchange data directly.

Figure 3:
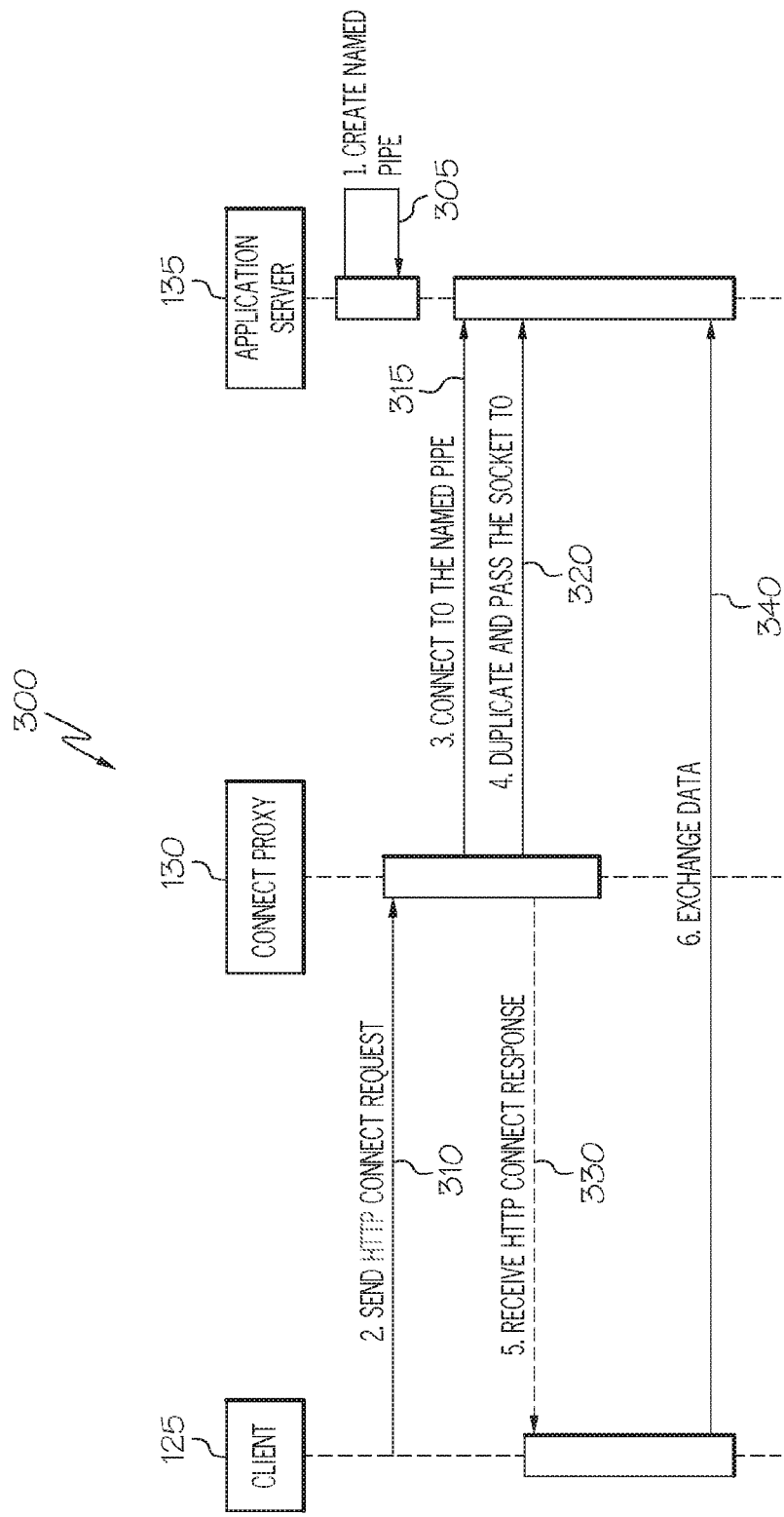
FIG. 3 is a sequence diagram illustrating establishing and handing off a shared socket according to an example embodiment.

FIG. 3 illustrates a sequence diagram of establishing and handing off a shared socket generally at 300. The application non-HTTP server, such as application server 135, creates a named pipe at 305, which is named to the predefined GUID of the server 135 plus the destination port number, port 1 in this example. Once the second HTTP CONNECT request from the client at 310 has been sent to the HTTP server, it will try to establish the connection at 315 to a named pipe server, whose name is assembled according to both the predefined GUID and the destination server port number. A HTTP server proxy module calls a Windows API—WSADuplicateSocket, to duplicate the socket, which will add a reference counter to the socket. The reference counter may be used to release the socket when it decreases to zero. At the named pipe server end, the application server in turn calls the Windows API WSASocket to obtain a socket descriptor related to the current process address space. However, WSADuplicateSocket is not without any restriction to automatically pass a socket to the application server at 320. The following illustrates the WSADuplicateSocket function prototype. The second parameter dwProcessId should be the destination process identifier.

int WSADuplicateSocket(_in SOCKET s,
        _in DWORD dwProcessId,
        _out LPWSAPROTOCOL_INFO lpProtocolInfo);

Thanks to the named pipe, the Windows API GetNamedPipeServerProcessId function may be used to get the destination server process identifier by the established named pipe handle. Then the socket can be automatically passed to the application server process address space at 320, which is the name pipe server end.

The network client has to wait until it receives the response at 330 from the HTTP server CONNECT proxy. Once the request has been acknowledged by the HTTP server, the client can exchange data as indicated at 340 with the application server directly by the shared socket connection. The exchange may occur even if the HTTP server is temporarily down.

Although the above proxy mechanism can transfer raw TCP data to and from the application server, the data is plaintext and can be inspected by any mediate equipment. What's more some equipment has the capability of stateful inspection, which can cut off the NON-HTTP data stream without HTTP protocol header at any time. In one embodiment, the data stream may be encrypted by SSL (Secure Socket Layer protocol), which means the HTTP server port merely accepts SSL based connections. Accordingly, the above HTTP CONNECT protocol will be HTTPS CONNECT where secure communications are desired. The HTTPS protocol is effectively HTTP on top of SSL. Despite the socket sharing mechanism provided by the operating system, the SSL protocol data in the source process address space can't cross the local process address boundaries.

Figure 4:
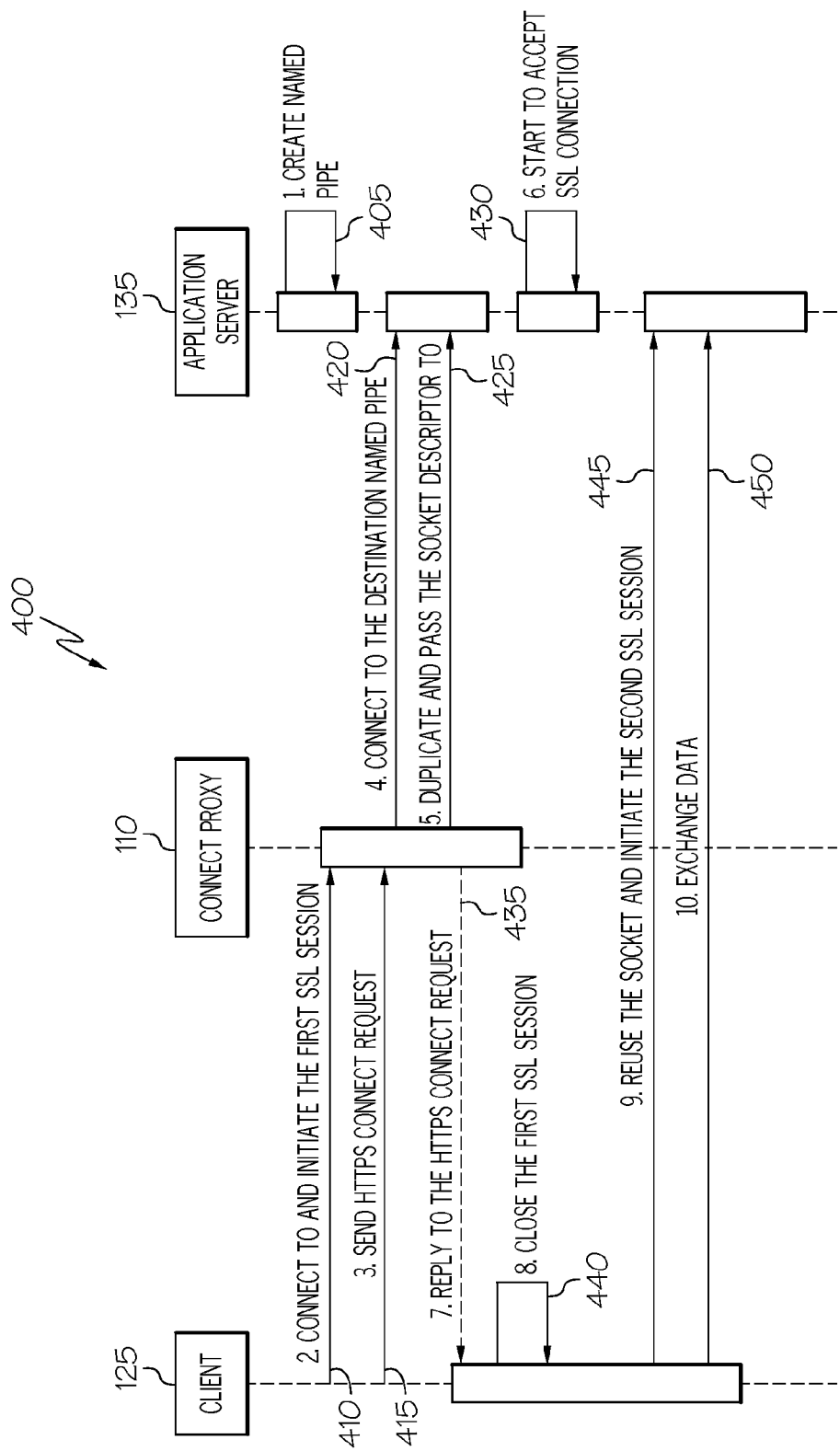
FIG. 4 is a sequence diagram illustrating establishing a secure connection according to an example embodiment.

FIG. 4 illustrates the interaction sequence diagram between the network client and HTTP server proxy server and between the HTTP server and the application server to overcome this issue at 400.

At 405, the application server, such as 135, creates a named pipe according to the above rule. At 410, the network client connects to the HTTP server 110 proxy and initiates the first SSL session by sending a SSL Hello Message to the HTTP server proxy. At 415, the client sends an HTTPS CONNECT request to HTTP server 110 CONNECT proxy and specifies the port number to connect to.

Once the HTTP server CONNECT proxy receives the request, it will try to connect at 420 to the destination named pipe, and then duplicate the socket at 425 to increase reference counter before it passes the duplicated socket to the application server, which may also be referred to as a backend server. The application server 135 then starts to accept the SSL connection at 430.

After HTTP server CONNECT proxy returns the HTTPS CONNECT response to the client at 435, HTTP server 110 CONNECT proxy will close the socket and the network client will close the SSL session at 440 to terminate the session.

The network client reuses the socket at 445 and initiates another SSL session, while the application server has already started to accept the SSL connection at 430. Finally, after the second SSL protocol handshake between the client and the application server has been established, the client 125 now can exchange data with the application server 135 directly as indicated at 450.

Nonetheless, according to RFC 6101 (SSL (Secure Socket Layer) Protocol Version 3.0), the client and the server share knowledge that the connection is ending. Either party may initiate the exchange of closing messages. This close notification message notifies the recipient that the sender will not send any more messages on this connection. Either party may initiate a close by sending a close notification alert. Because the HTTP server CONNECT proxy and the application server share the same socket, the SSL close notification alert will be transferred to the application server through this socket, after the client closes the first SSL session, which results in that the peer will terminate the SSL session with the unexpected close alert rather than the friendly initiative SSL Hello message. There are two ways to resolve this issue.

Regarding to the implementation of the client and the HTTP server CONNECT proxy based on OpenSSL SDK, they should not send close notification to each other during the first SSL session, which can be realized by calling the function SSL_set_quiet_shutdown in OpenSSL SDK.

Figure 5:
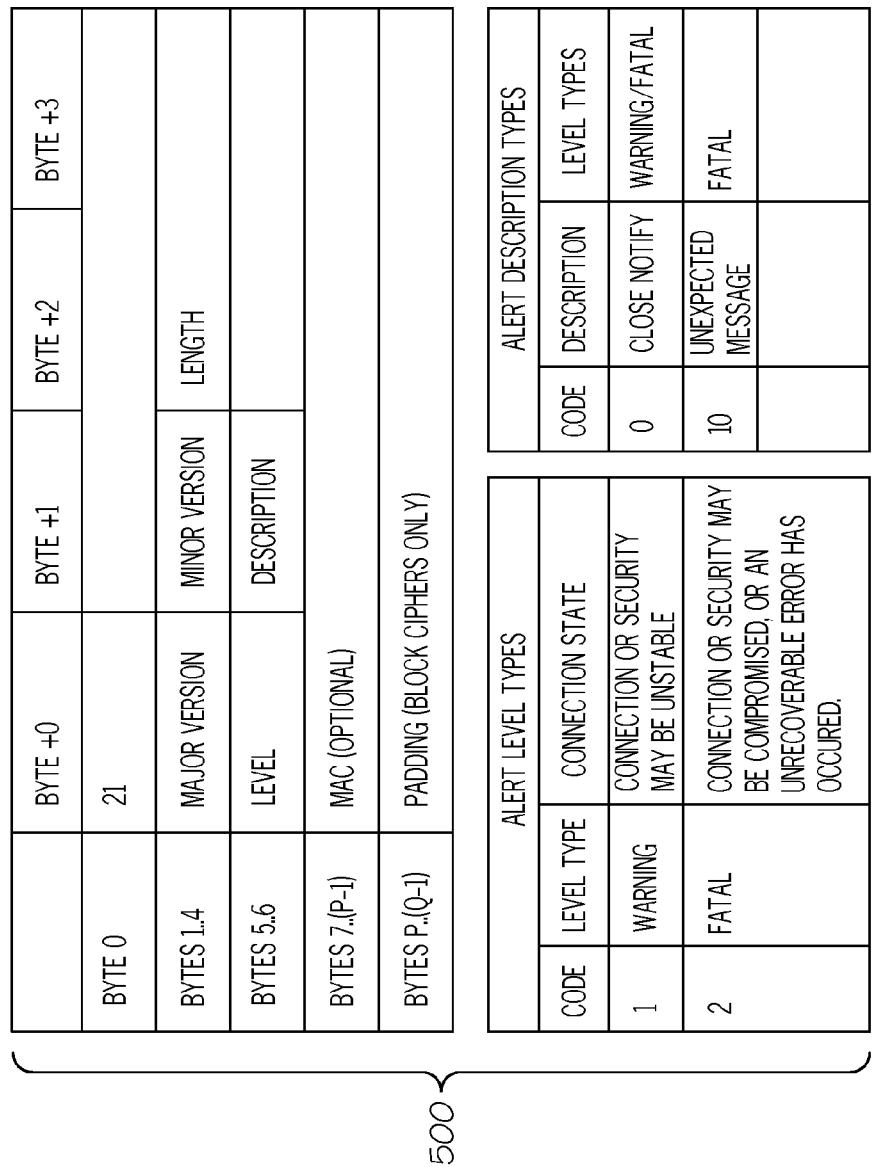
FIG. 5 is a table illustrating alert protocols for secure communications according to an example embodiment.

After protocol analysis, the first byte of alert protocol record is always the number "21". A field level identifies the level of alert. A field description identifies which type of alert is being sent. FIG. 5 in table 500 depicts the SSL alert protocol format in RFC 6101.

To be compatible with the standard SSL client, during the third step, the application server will inspect the incoming SSL data packet and discard this kind of close alert to avoid unexpected termination, and then it can finish this SSL handshake connection successfully.

The port sharing solution can improve the scalability of product deployment on the wide area network with HTTP compliant. Performance improvement can be achieved without the complex changes and implementation of HTTP protocol for a backend NON-HTTP application server.

To be contrasted with traditional solutions, the use of multiplexed port sharing is a solution that can establish direct connection between the client and the application server without the data relay, which decreases the load pressure of the intermediate server to a significant extent. The solution is also compatible with SSL communications. Once a connection is established, the HTTP server is not a single point of failure.

Figure 6:
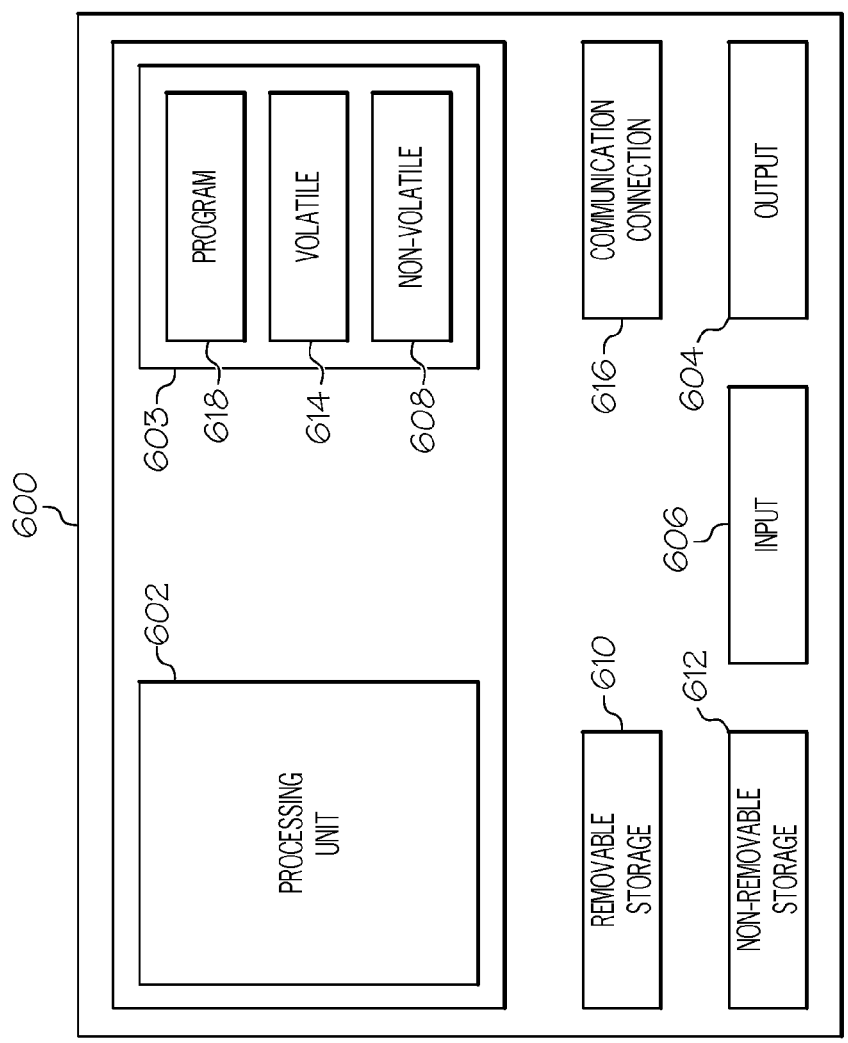
FIG. 6 is a block diagram of an example computer system for implementing methods and servers according to an example embodiment.

FIG. 6 is a block schematic diagram of a computer system 600 to implement servers, clients, methods, and other devices or algorithms according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 600, may include a processing unit 602, memory 603, removable storage 610, and non-removable storage 612. Memory 603 may include volatile memory 614 and non-volatile memory 608. Computer 600 may include— or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 616. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
after a secure sockets layer session is established between a client on a first device and a web server on a second device and after the client sends a CONNECT request to the web server,
the second device duplicating a socket corresponding to the established secure sockets layer session and establishing an inter-process communication channel with a named pipe created by an application server indicated in the CONNECT request;
passing, by the second device, a first socket descriptor to the application server via the inter-process communication channel established with the named pipe created by the application server indicated in the CONNECT request, wherein the first socket descriptor corresponds to the duplicate socket; and replying to the CONNECT request to establish a direct connection between the client and the application server that bypasses the web server with the duplicate socket.

2. The method of claim 1, wherein the CONNECT request comprises an HTTPS CONNECT request.

3. The method of claim 1, wherein passing the socket descriptor to the application server causes the application server to create a second socket descriptor for the socket.

4. The method of claim 1, wherein the named pipe comprises a global unique identifier and a port number for the application server.

5. The method of claim 1, wherein said passing, by the second device, the first socket descriptor to the application server via the inter-process communication channel established with the named pipe created by the application server indicated in the CONNECT request comprises passing, by the second device, the first socket descriptor to a shared multiplexed of the application server via the inter-process communication channel established with the named pipe created by the application server indicated in the CONNECT request.

6. The method of claim 1 further comprising incrementing, by the second device, a reference counter for the duplicate socket.

7. The method of claim 1, wherein the web server is protected by a firewall.

8. The method of claim 1, wherein said establishing an inter-process communication channel with a named pipe created by an application server indicated in the CONNECT request comprises obtaining, by the second device, a global unique identifier and a port number related to a process running on the application server.

9. A system comprising:
a processor;
a non-transitory computer readable storage medium having program code, the program code executable by the processor cause the system to:
after a secure sockets layer session is established between a client on a first device and a web server on the system and after the client sends a CONNECT request to the web server on the system,
duplicate a socket corresponding to the established secure sockets layer session and establish an inter-process communication channel with a named pipe created by an application server indicated in the CONNECT request;
pass a first socket descriptor to the application server via the inter-process communication channel established with the named pipe created by the application server indicated in the CONNECT request, wherein the first socket descriptor corresponds to the duplicate socket; and
reply to the CONNECT request to establish a direct connection between the client and the application server that bypasses the web server with the duplicate socket.

10. The system of claim 9, wherein the CONNECT request comprises an HTTPS CONNECT request.

11. The system of claim 9, wherein the program code executable by the processor to cause the system to pass the first socket descriptor to the application server causes the application server to create a second socket descriptor for the socket.

12. The system of claim 9, wherein the program code executable by the processor to cause the system to pass the first socket descriptor to the application server via the inter-process communication channel established with the named pipe created by the application server indicated in the CONNECT request comprises program code executable by the processor to cause the system to pass the first socket descriptor to a shared multiplexed of the application server via the inter-process communication channel established with the named pipe created by the application server indicated in the CONNECT request.

13. The system of claim 9, further comprising program code executable by the processor to cause the system to increment a reference counter for the duplicate socket.

14. The system of claim 9, wherein the program code executable by the processor to cause the system to establish an inter-process communication channel with a named pipe created by an application server indicated in the CONNECT request comprises program code executable by the processor to cause the system to obtain a global unique identifier and a port number related to a process running on the application server.

15. A computer program product comprising:
a non-transitory computer readable storage medium having computer readable program code embodied therewith, the computer program code to:
after a secure sockets layer session is established between a client on a first device and a web server on a second device and after the client sends a CONNECT request to the web server,
duplicate a socket corresponding to the established secure sockets layer session and establish an inter-process communication channel with a named pipe created by an application server indicated in the CONNECT request;
pass a first socket descriptor to the application server via the inter-process communication channel established with the named pipe created by the application server indicated in the CONNECT request, wherein the first socket descriptor corresponds to the duplicate socket; and
reply to the network client CONNECT request to establish a direct connection between the client and the application server that bypasses the web server with the duplicate socket.

16. The computer program product of claim 15, wherein the CONNECT request comprises an HTTPS CONNECT request.

17. The computer program product of claim 15, wherein the program code to pass the first socket descriptor to the application server via the inter-process communication channel established with the named pipe created by the application server indicated in the CONNECT request comprises program code to pass the first socket descriptor to a shared multiplexed of the application server via the inter-process communication channel established with the named pipe created by the application server indicated in the CONNECT request.

18. The computer program product of claim 15, wherein the program code to pass the first socket descriptor to the application server causes the application server to create a second socket descriptor for the socket.

19. The computer program product of claim 15, wherein the named pipe comprises a global unique identifier and a port number for the application server.

20. The computer program product of claim 15, wherein the web server is protected by a firewall.

21. The computer program product of claim 15 further comprising program code to increment a reference counter for the duplicate socket.

22. The system of claim 9, wherein the named pipe comprises a global unique identifier and a port number for the application server.

23. The system of claim 9, wherein the system is protected by a firewall.

* * * * *